US011345471B2

(12) United States Patent
Schwartz (10) Patent No.: US 11,345,471 B2
(45) Date of Patent: *May 31, 2022

(54) FLOW DIVERTING LIFT ELEMENT (71) Applicant: Derek T. Schwartz, Tempe, AZ (US)

(72) Inventor: Derek T. Schwartz, Tempe, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/113,970

(22) Filed: Aug. 27, 2018

(65) Prior Publication Data

US 2019/0002099 A1  Jan. 3, 2019

Related U.S. Application Data (63) Continuation of application No. 15/647,029, filed on Jul. 11, 2017, now Pat. No. 10,059,443, which is a continuation of application No. 14/798,914, filed on Jul. 14, 2015, now Pat. No. 9,708,060.

(60) Provisional application No. 61/999,050, filed on Jul. 15, 2014, provisional application No. 62/230,706, filed on Jun. 12, 2015.

(51) Int. Cl.
*B64C 39/00* (2006.01)
*B64C 11/00* (2006.01)

(52) U.S. Cl.
CPC .......... *B64C 39/006* (2013.01); *B64C 11/006* (2013.01)

(58) Field of Classification Search
CPC ... B64C 11/007; B64C 23/005; B64C 39/064; B64C 27/615; B64C 27/20; B64C 27/00; B64C 29/0016; Y02T 50/34
See application file for complete search history.

(56) References Cited

U.S. PATENT DOCUMENTS

| | | | |
|---|---|---|---|
| 1,738,611 A | 12/1929 | Rasmussen | |
| 1,906,764 A | 5/1933 | Petersen | |
| 2,008,464 A | 7/1935 | Nishi | |
| 2,402,957 A | 7/1946 | Geddes | |
| 3,274,410 A | 9/1966 | Boivie | |
| 3,572,613 A * | 3/1971 | Porter | B64C 39/06 244/12.2 |
| 3,603,700 A * | 9/1971 | Eskeli | B64C 39/064 416/180 |
| 3,838,835 A | 10/1974 | Kling | |
| 4,202,518 A | 5/1980 | Burnham et al. | |
| 4,301,981 A * | 11/1981 | Hartt | B64C 27/32 244/12.2 |
| 4,560,358 A | 12/1985 | Adler | |
| 5,328,333 A | 7/1994 | Quinn | |
| 5,503,351 A | 4/1996 | Vass | |
| 6,086,016 A * | 7/2000 | Meek | B64C 27/02 244/17.11 |

(Continued)

OTHER PUBLICATIONS

Schwartz, Derek T., Flow Diverting Lift Element, International Search Report and Written Opinion of the International Search Authority, PCT Serial No. PCT/US2016/042043, filed Jul. 13, 2016.

*Primary Examiner* — Richard G Davis (57) ABSTRACT

Disclosed are embodiments of flow diverting lift elements which, when placed in the proper orientation and propelled through a fluid, produce a lift force with improved lift versus velocity performance. The flow diverting lift elements can produce lift for rotary lift devices such as aircraft. The flow diverting lift devices include an airfoil and a diversion wall extending from an upper surface of the airfoil. The airfoil can be an annular airfoil.

5 Claims, 9 Drawing Sheets (56) References Cited

U.S. PATENT DOCUMENTS

| | | | |
|---|---|---|---|
| 6,382,560 B1 * | 5/2002 | Ow | B64C 27/20 |
| | | | 244/12.2 |
| 6,669,138 B1 * | 12/2003 | Arrieta | B64C 39/064 |
| | | | 244/12.2 |
| 2002/0155001 A1 | 10/2002 | Reinfeld et al. | |
| 2002/0155002 A1 | 10/2002 | Reinfeld et al. | |
| 2002/0168266 A1 | 11/2002 | Reinfeld et al. | |
| 2012/0068021 A1 | 3/2012 | Babinsky et al. | |
| 2016/0152338 A1 | 6/2016 | Schlunke et al. | |

* cited by examiner

FIG. 7

FLOW DIVERTING LIFT ELEMENT

CROSS REFERENCE TO RELATED APPLICATION

This application is a continuation of U.S. patent application Ser. No. 15/647,029, filed Jul. 11, 2017, which is a continuation of U.S. patent application Ser. No. 14/798,914, filed Jul. 14, 2015, (now U.S. Pat. No. 9,708,060, granted Jul. 18, 2017) which claims priority to U.S. Provisional Patent Application No. 61/999,050, filed Jul. 15, 2014, which are incorporated entirely herein by reference. This application also claims priority to U.S. Provisional Patent Application No. 62/230,706, filed Jun. 12, 2015, which is incorporated entirely herein by reference.

BACKGROUND OF THE INVENTION

Technical Field

This invention relates to a lift-producing element, more specifically to an element which generates a lift force in the presence of a fluid.

State of the Art

Typically, when a lift force is desired, it is produced by propelling a traditionally-shaped foil through a fluid at a suitable angle of attack, and at a sufficient velocity. Using a foil in this way produces a lift force, but also produces unfavorable fluid flow conditions behind the foil. Among other effects, these unfavorable fluid flow conditions can degrade the performance of a trailing foil placed in the downstream path of the leading producing foil, and can be a problematic constraint on the placement of other lift-producing foils.

In addition, high speed is frequently required to generate lift. For example, airplanes frequently need long runways, and helicopters frequently need long blades in order to propel their foils through the air at sufficient speeds to produce desired lift characteristics.

Accordingly, what is needed is a lift producing element that redirects the turbulent unfavorable fluid flow away from the downstream path, which allows more favorable fluid flow conditions in the region behind the forward foil, providing improved fluid conditions for placement of trailing foils, or for another lift producing element. Accordingly, what is also needed is a lift producing element that creates greater lift at lower velocities. In addition, what is needed are alternate configurations of lift-producing elements which provide for alternate configurations of lift surfaces.

DISCLOSURE OF THE INVENTION

The disclosed invention relates to a flow diverting lift element and a rotary lift device.

Disclosed is a flow diverting lift element that includes an airfoil and a diversion wall coupled to the airfoil. The airfoil includes an upper curved surface, a lower planar surface, and a leading edge. The diversion wall is coupled to and extends perpendicular to the upper curved surface. The diversion wall intersects the upper curved surface at an angle with respect to the leading edge.

Disclosed is a rotary lift device that includes a rotor rotatable by a motor. The motor is mechanically coupled to the rotor. The rotor includes an annular disc having an upper surface, and a plurality of flow diverting lift elements spaced evenly apart on the upper surface. Each flow diverting lift element includes an airfoil and a diversion wall extending from the airfoil. Each airfoil includes an upper curved surface, a lower planar surface, and a leading edge. Each diversion wall extends perpendicularly from the upper curved surface. The diversion wall intersects the upper curved surface at an angle with respect to the leading edge.

Disclosed is rotary lift device that includes a flow diverting lift element rotatable by a motor. The motor is mechanically coupled to the flow diverting lift element. The flow diverting lift element includes an annular airfoil. The annular airfoil includes an upper curved surface, a leading edge, where the leading edge extends along an inner perimeter of the annular airfoil, and a plurality of diversion walls extending perpendicularly to, and spaced evenly apart on, the upper curved surface of the annular airfoil. Each diversion wall intersects the upper curved surface of the annular airfoil at an angle with respect to a tangent to the leading edge.

Disclosed is an aircraft that includes a fuselage and at least one rotary lift device coupled to the fuselage.

The foregoing and other features and advantages of the invention will be apparent to those of ordinary skill in the art from the following more particular description of the invention and the accompanying drawings.

BRIEF DESCRIPTION OF THE DRAWINGS

The various embodiments will hereinafter be described in conjunction with the following drawing figures, wherein like numerals denote like elements, and wherein.

DETAILED DESCRIPTION OF EMBODIMENTS OF THE INVENTION

As discussed above, disclosed herein are embodiments of flow diverting lift elements. It is believed that at some velocities using a conventional airfoil (also referred to as a foil) there can be advantageous pressure conditions in the fluid flow above the upper surface, and towards the front of a foil, and unfavorable conditions towards the rear. Described herein are embodiments of flow diverting lift elements which produce improved fluid conditions in the region of space following and immediately behind the flow diverting lift elements. It is believed that by diverting the flow which might otherwise become an adverse influence on the airfoil if it were allowed to pass over the rear portions of the foil, it is possible to achieve a more advantageous lift to velocity relationship. Diverting the flow may also prevent stall conditions. The flow diverting lift elements as described herein produce improved lift at lower velocities. The flow diverting lift elements as described herein have the effect of altering velocities of fluids in such a way as to beneficially affect lift. Additionally, it is believed that one or more of the embodiments described herein may allow for the production of lift with a less objectionable sound profile, and one or more aspects may improve safety due to lower rotational velocity.

Figure 1:
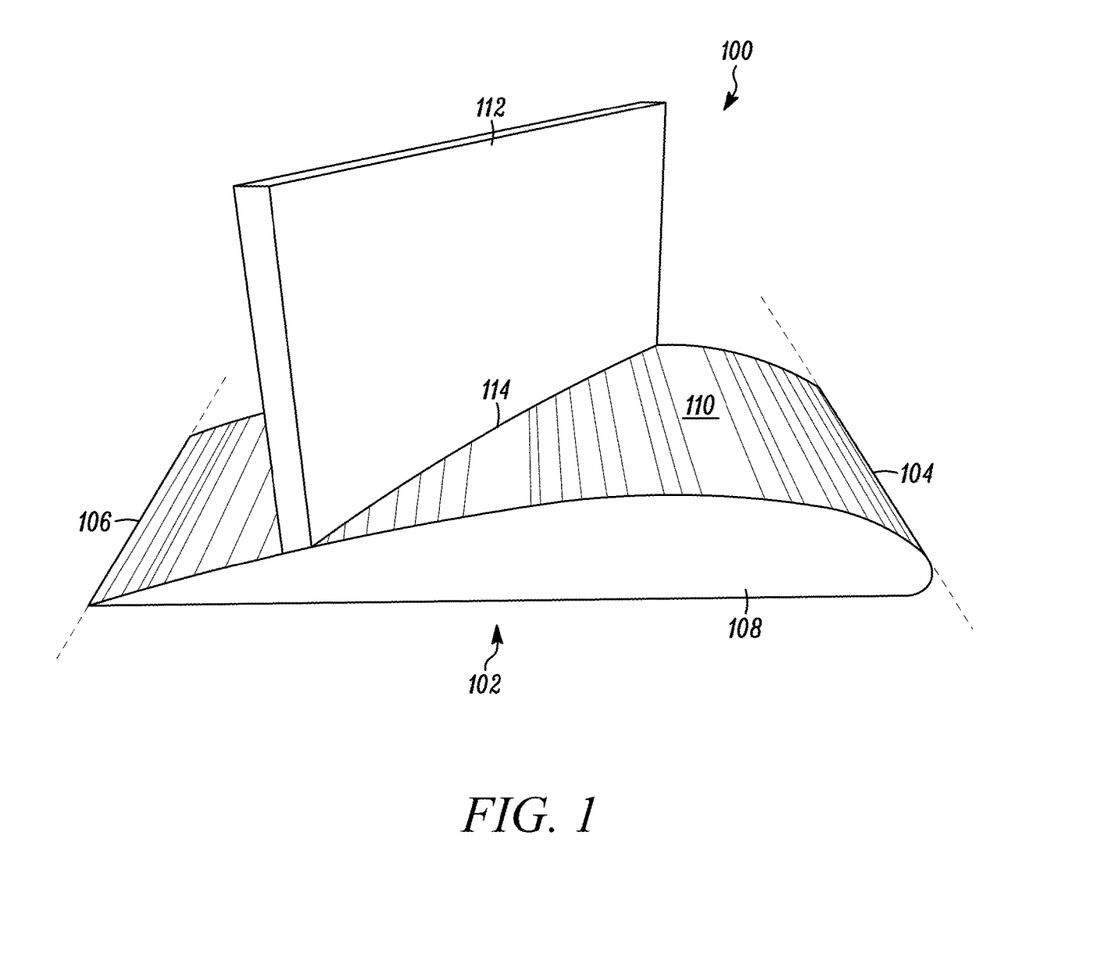
FIG. 1 shows an elevated perspective left side view of an embodiment of a flow diverting lift element 100.

FIG. 1 shows an elevated perspective view of an embodiment of a flow diverting lift element 100. Flow diverting lift element 100 includes an airfoil 108 and a diversion wall 112. Airfoil 108 includes a curved upper surface 110, a generally planar lower surface 102, a leading edge 104 and a trailing edge 106. Fluid flow over airfoil 108 is from leading edge 104 to trailing edge 106. Diversion wall 112 extends from curved upper surface 110 at an angle approximately perpendicular to curved upper surface 110. Diversion wall 112 intersects curved upper surface 110 along an intersection line 114. Intersection line 114 extends along curved upper surface 110 at an angle 201 to leading edge 104 (see FIG. 2B). In the embodiment shown, angle 201 is about 45 degrees, but this is not meant to be limiting.

Figure 2A:
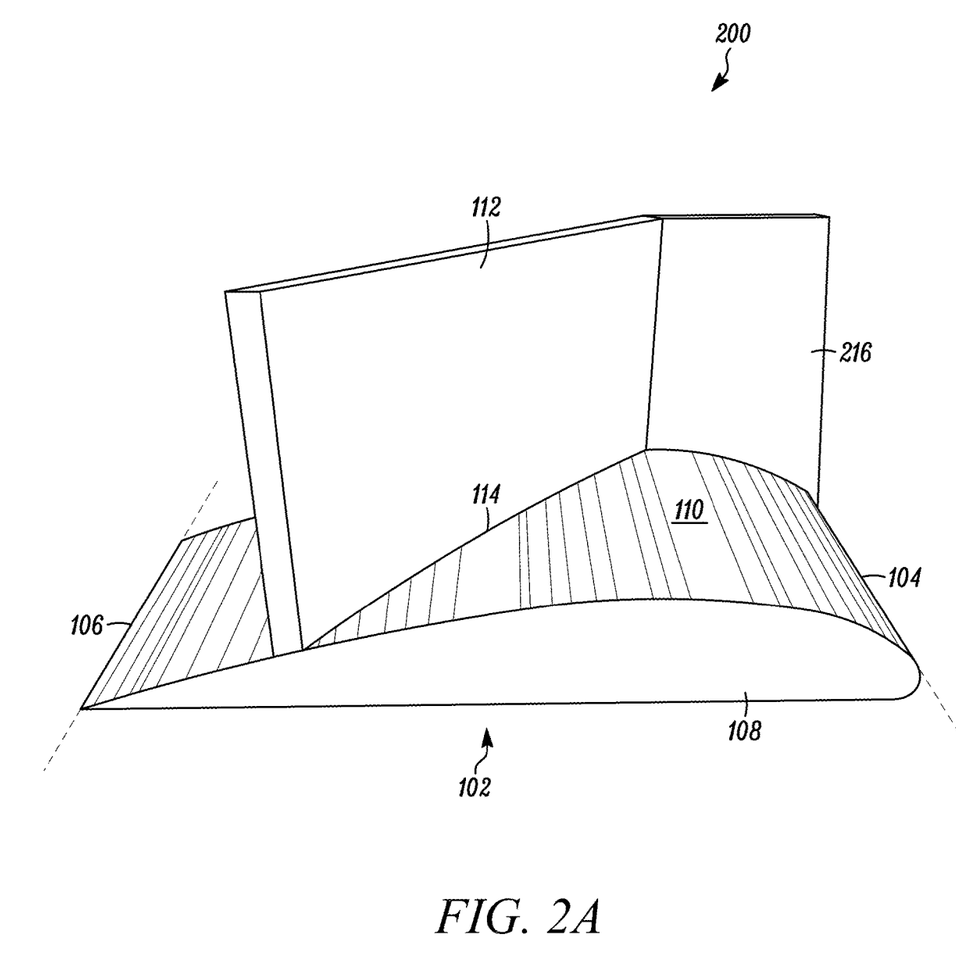
FIG. 2A shows an elevated perspective left side view of an embodiment of a flow diverting lift element 200.

FIG. 2A is a perspective view of an embodiment of a flow diverting lift element 200. Flow diverting lift element 200 is similar to flow diverting lift element 100, with the addition of a guide wall 216. Guide wall 216 is coupled to airfoil 108. Guide wall 216 extends from curved upper surface 110, approximately perpendicular to curved upper surface 110. Guide wall 216 extends in a direction perpendicular to leading edge 104. In this embodiment, guide wall 216 extends from leading edge 104 to diversion wall 112.

Figure 2B:
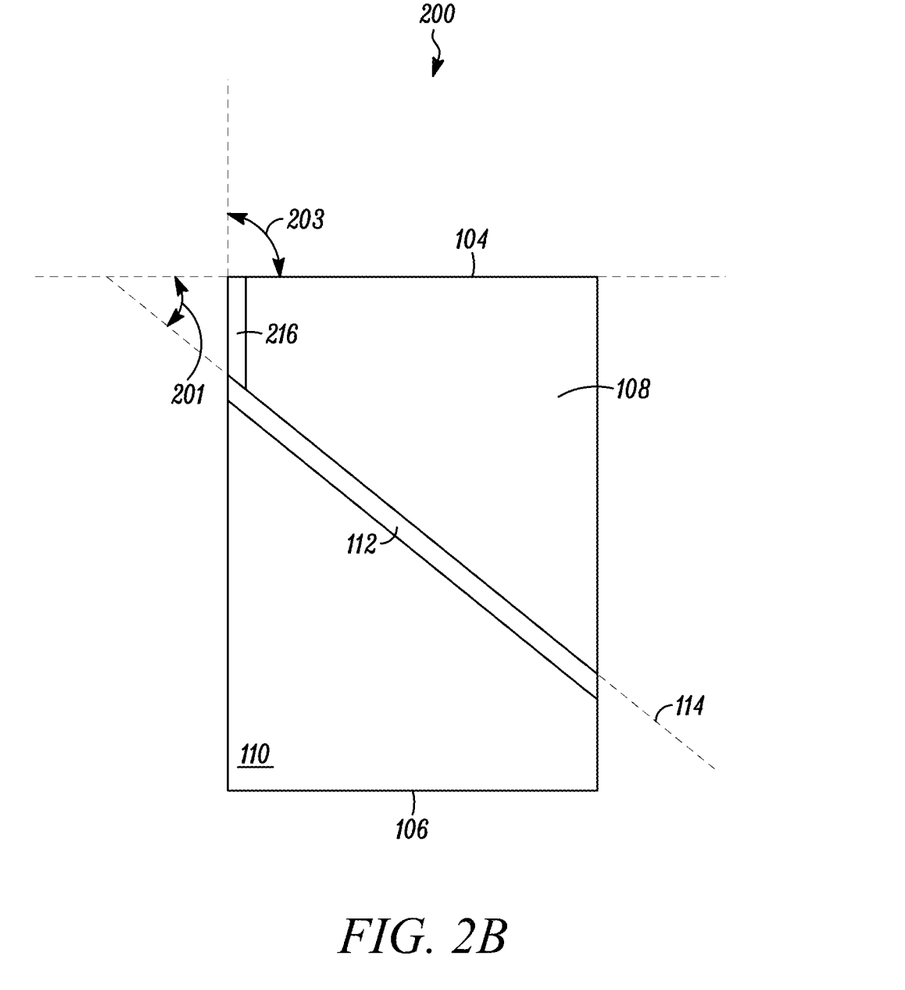
FIG. 2B is an overhead view of flow diverting lift element 200.

FIG. 2B is an overhead view of flow diverting lift element 200 showing upper surface 110 of airfoil 108, diversion wall 112, guide wall 216, an angle of intersection 201 and an angle of intersection 203. Angle of intersection 201 is the angle that intersection line 114 of diversion wall 112 makes with respect to leading edge 104. Angle 201 in this embodiment is about 45 degrees. Angle 201 in some embodiments is in the range of about 0 degrees to about 60 degrees. Angle 201 in some embodiments is in the range of about 0 to about 180 degrees. Angle of intersection 203 is the angle that guide wall 216 intersects leading edge 104. In this embodiment, guide wall 216 is perpendicular to leading edge 104, thus angle 203 is 90 degrees. In some embodiments, angle 203 is between about 30 degrees and about 150 degrees. In some embodiments, angle 203 is between about 0 degrees and about 180 degrees.

Flow diverting lift element 100 and 200 produce lift when propelled through a fluid such as air. Flow diverting lift element 100 and 200 improve the fluid conditions behind trailing edge 106, can produce lift at lower velocities, and decrease undesirable wake turbulence for airfoils trailing flow diverting lift devices 100 and 200, as discussed further below.

Curved upper surface 110 as shown in FIG. 1 and FIG. 2 exhibits an airfoil-shaped curvature. It should be noted that many different curves can be used other than the airfoil shape used in the embodiment of airfoil 108 shown in FIG. 1 and FIG. 2. For example, circular, parabolic, and/or different airfoil profiles can be utilized depending on the characteristics consistent with the desired application. A horizontally flat upper surface 110 may also be used in some embodiments. It should be understood that diversion wall 112 can exhibit forms other than the planar shape as shown in FIG. 1 and FIG. 2. Some possible shapes include, but are not limited to, circularly curved, parabolic, concave, convex, foil shaped, and jagged shaped.

Figure 3:
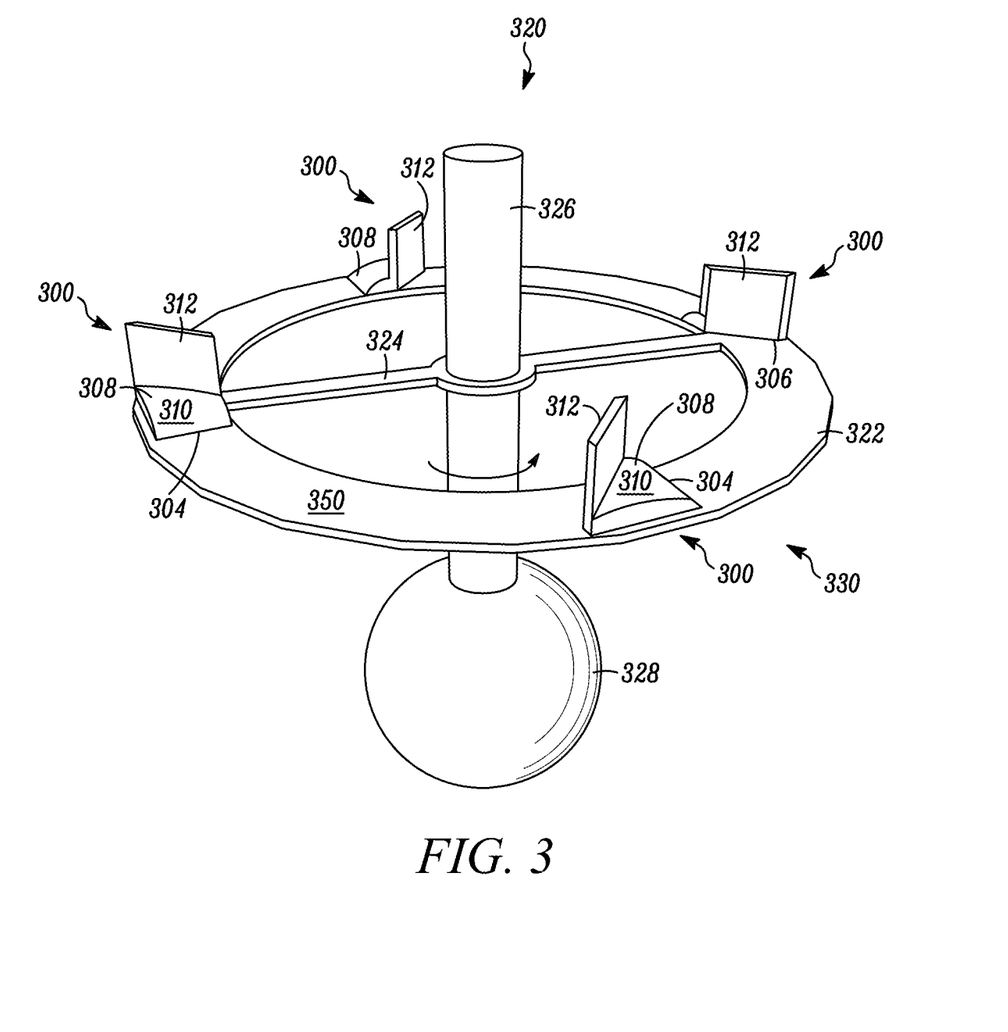
FIG. 3 shows a perspective view of an embodiment of a rotary lift device 320.

FIG. 3 shows a perspective view of an embodiment of a rotary lift device 320. Rotary lift device 320 includes a rotor 330 rotated by a motor 328. Rotor 330 is mechanically coupled to motor 328, and motor 328 rotates rotor 330. Rotor 330 is mechanically coupled to a connecting arm 324, which is mechanically coupled to a central axle 326. Motor 328 rotates central axle 326, which rotates connecting arm 324 and rotor 330. Rotor 330 includes an annular disc 322 and a plurality of flow diverting lift elements 300 located on and coupled to an upper surface 350 of annular disc 322.

Flow diverting lift element 300 is similar to flow diverting lift elements 100 and 200, with like numbers indicating like elements. In some embodiments, flow diverting lift elements 100 or 200 can be used in place of flow diverting lift elements 300. Each flow diverting lift element 300 has a generally planar lower surface that is in contact with upper surface 350 of annular disc 322.

Each flow diverting lift element 300 includes an airfoil 308 and a diversion wall 312. Each airfoil 308 includes an upper curved surface 310, a leading edge 304, a trailing edge 306 and a lower surface coupled to upper surface 350 of annular disc 322. Each diversion wall 312 extends approximately perpendicularly from upper curved surface 310, at an angle with respect to leading edge 306, as explained above for diversion wall 112 and shown in FIG. 2B.

Flow diverting lift elements 300 are arranged on annular disc 322 for counter-clockwise rotation of annular disc 322. In this direction of rotation, direction of fluid in the operation of rotary lift device 320 is partially in the direction from leading edge 304 towards trailing edge 306, and partially in a radial outward direction. It is to be understood that the opposite rotation is possible by mirror imaging the position of flow diverting lift elements 300. In the embodiment shown, there are four flow diverting lift elements 300 coupled to upper surface 350, equally spaced apart, but this is not meant to be limiting. Other numbers of flow diverting lift elements 300 and other uneven spacing may be used to achieve different effects.

Figure 4:
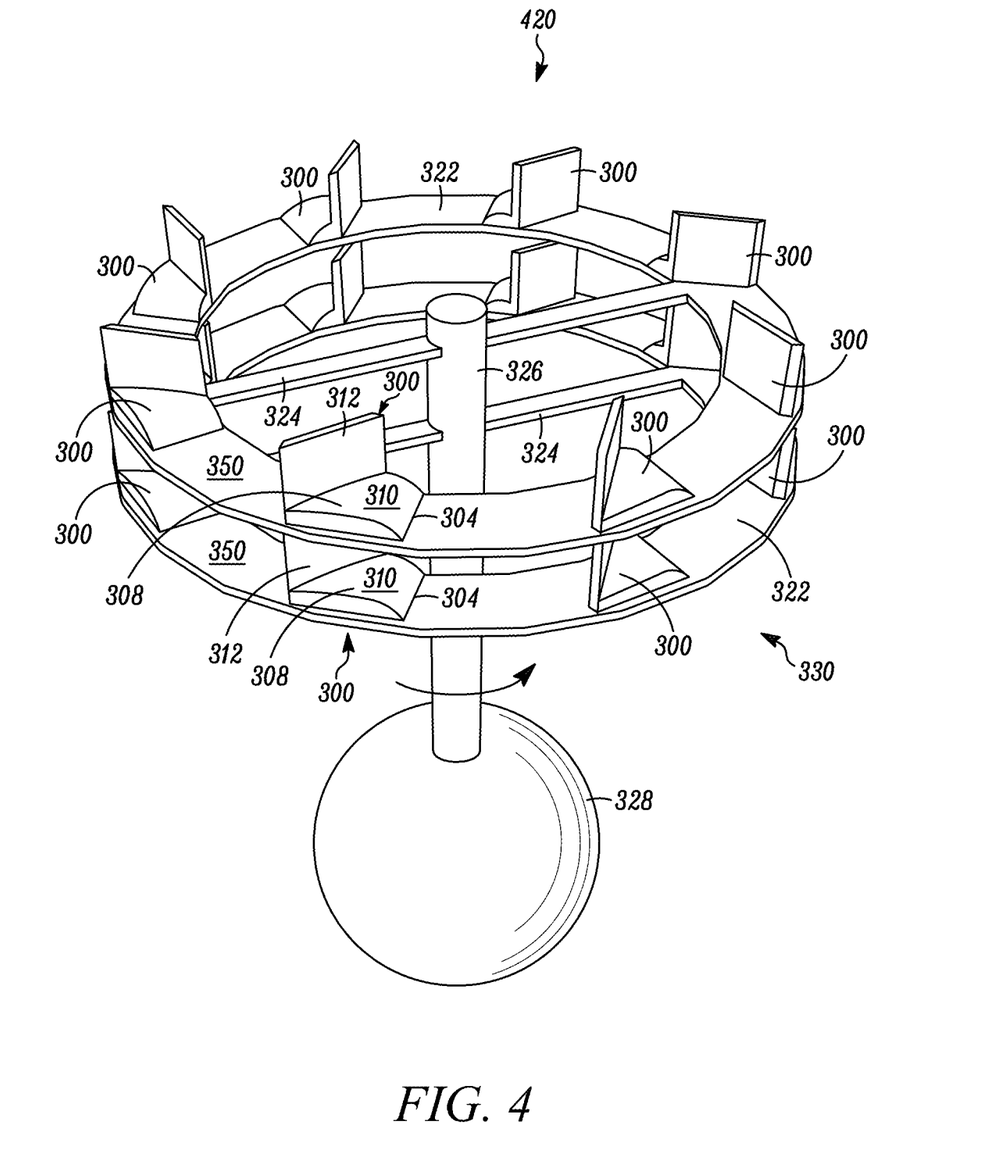
FIG. 4 shows a perspective view of an embodiment of a rotary lift device 420.

FIG. 4 shows a perspective view of an embodiment of a rotary lift device 420. Rotary lift device 420 is similar to rotary lift device 320, except rotor 330 of rotary lift device 420 has a plurality of annular discs 322 in a stacked configuration. Rotor 330 includes two annular discs 322 arranged in parallel planes, with each annular disc 322 driven by central axle 326. Each annular disc 322 has a plurality of flow diverting lift elements 300 connected to the upper surface 350 of each annular disc 322. The plurality of flow diverting lift elements 300, are arranged in a circular configuration on both annular discs 322 and are again oriented for a counter-clockwise rotation of rotor 330. Both annular discs 322 are coupled via connecting arms 324 to central axle 326, which is coupled to motor 328.

Curved upper surface 310 as shown in FIG. 3 and FIG. 4 exhibits an airfoil-shaped curvature. It should be noted that many different curves can be used other than the airfoil shape used in the embodiment of airfoil 308 shown in FIG. 3 and FIG. 4. For example, circular, parabolic, and/or different airfoil profiles can be utilized depending on the characteristics consistent with the desired application. A horizontally flat upper surface 310 may also be used in some embodiments. It should be understood that diversion walls 312 can exhibit forms other than the planar shape as shown in FIG. 3 and FIG. 4. Some possible shapes include, but are not limited to, circularly curved, parabolic, concave, convex, foil shaped, and jagged shaped.

Figure 5A:
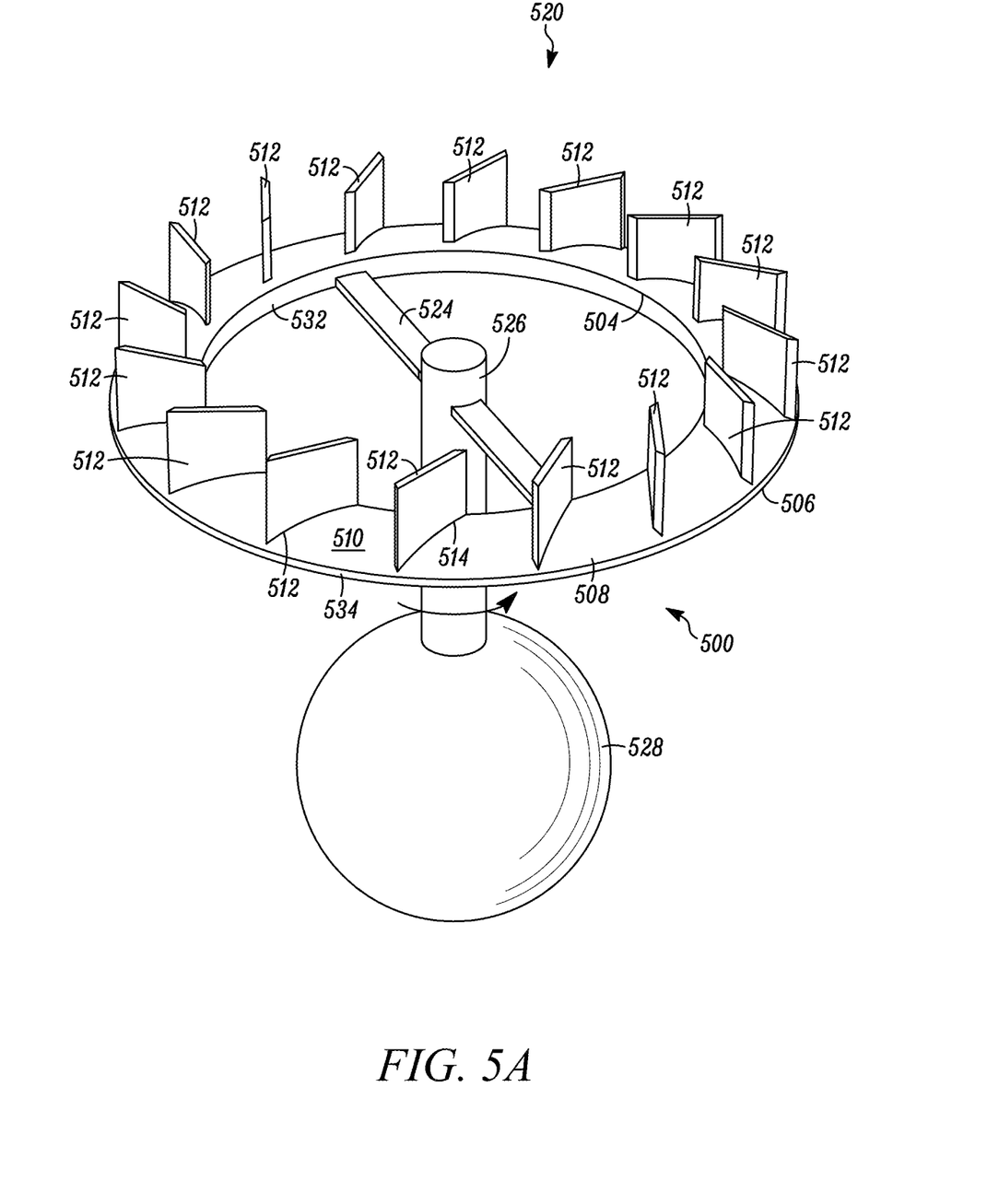
FIG. 5A shows an elevated perspective view of an embodiment of a rotary lift device 520.
Figure 5B:
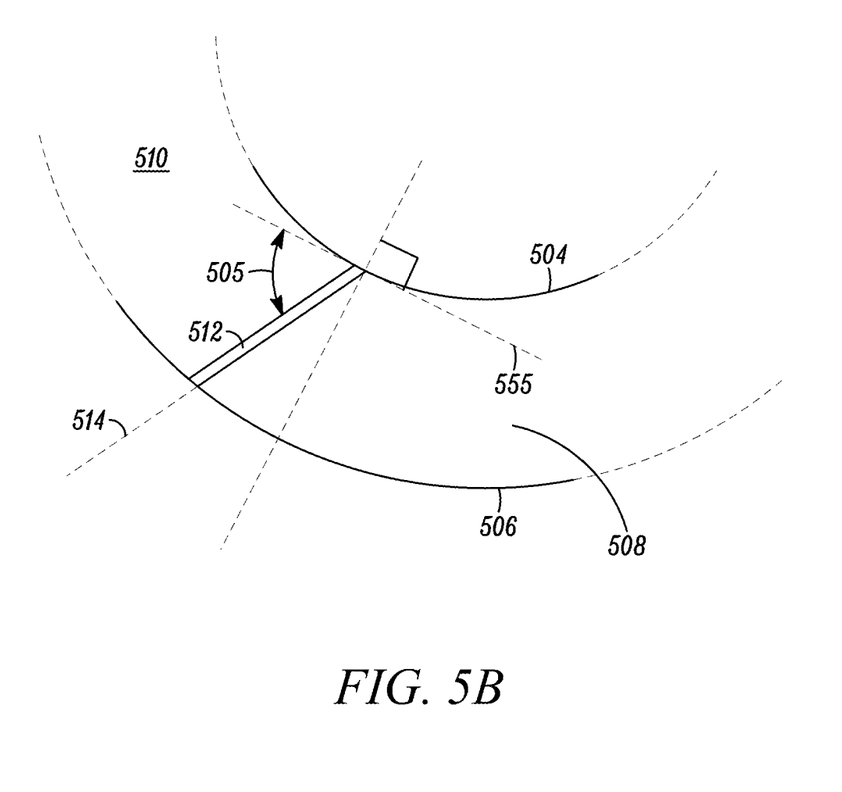
FIG. 5B is a top view of a portion of flow diverting lift element 500.

FIG. 5A shows an elevated perspective view of an embodiment of a rotary lift device 520 which includes a flow diverting lift element 500 rotatable by a motor 528. FIG. 5B shows a top view of a portion of flow diverting lift element 500. Motor 528 rotates a central axle 526, which rotates connecting arms 524 and flow diverting lift element 500. Flow diverting lift element 500 includes a solid, outwardly curved annular airfoil 508 from which a plurality of planar vanes, or diversion walls 512 extend approximately perpendicular to an upper curved surface 510 of annular airfoil 508. Annular airfoil 508 includes a leading edge 504, upper curved surface 510, and trailing edge 506. Leading edge 504 extends at or near an inner perimeter 532 of annular airfoil 508. Trailing edge 506 extends at or near an outer perimeter 534 of annular airfoil 508.

Each vertical diversion wall 512 is oriented at an angle 505 (FIG. 5B) to a tangent 555 of the leading edge 504 of annular airfoil 508 and is of sufficient length to span from roughly leading edge 504 of flow diverting lift element 500, to trailing edge 506 of flow diverting lift element 500 in this embodiment. Diversion walls 512 are oriented for a counterclockwise rotation of rotary lift device 520, but can be oriented in a mirror image configuration for the opposite rotation. The flow of fluid over airfoil 508 is from leading edge 504 to trailing edge 506.

It should be understood that diversion walls 512 can exhibit forms other than the planar shape as shown in FIGS. 5A and 5B. Some possible shapes include, but are not limited to, circularly curved, parabolic, concave, convex, foil shaped, and jagged shaped. Also, although each diversion wall 512 is shown as having an angle 505 of 45 degrees with respect to tangent 555 of leading edge 504 of annular airfoil 508, other angles 505 can be used. In some embodiments, angle 505 is in the range of approximately 0 degrees to approximately 180 degrees. In some embodiments, angle 505 is in the range of about 0 degrees to about 60 degrees. Diversion walls 512 which don't extend the full distance between leading edge 504 and trailing edge 506 of annular airfoil 508 may also be used to modify performance characteristics. Furthermore, although diversion walls 512 are evenly spaced around annular airfoil 508 in the embodiment shown, uneven spacing is used in some embodiments. It should also be noted that although sixteen diversion walls 512 are shown in FIG. 5A, any number of diversion walls 512 may be used.

Curved upper surface 510 as shown in FIG. 5A exhibits an airfoil-shaped curvature. It should be noted that many different curves can be used other than the airfoil shape used in the embodiment of airfoil 508 shown in FIG. 5A. For example, circular, parabolic, and/or different airfoil profiles can be utilized depending on the characteristics consistent with the desired application. A horizontally flat upper surface 510 may also be used in some embodiments.

Annular airfoil 508 has a generally planar lower surface (not shown). Upper surface 510, inner perimeter 532, outer perimeter 534, and the lower surface of annular airfoil 508 define the bounds of annular airfoil 508. It is to be understood that although a planar lower surface is described for annular airfoil 508, other profiles can be used. A curved or inclined lower surface of annular airfoil 508 may be used, depending on the desired performance characteristics.

Figure 6:
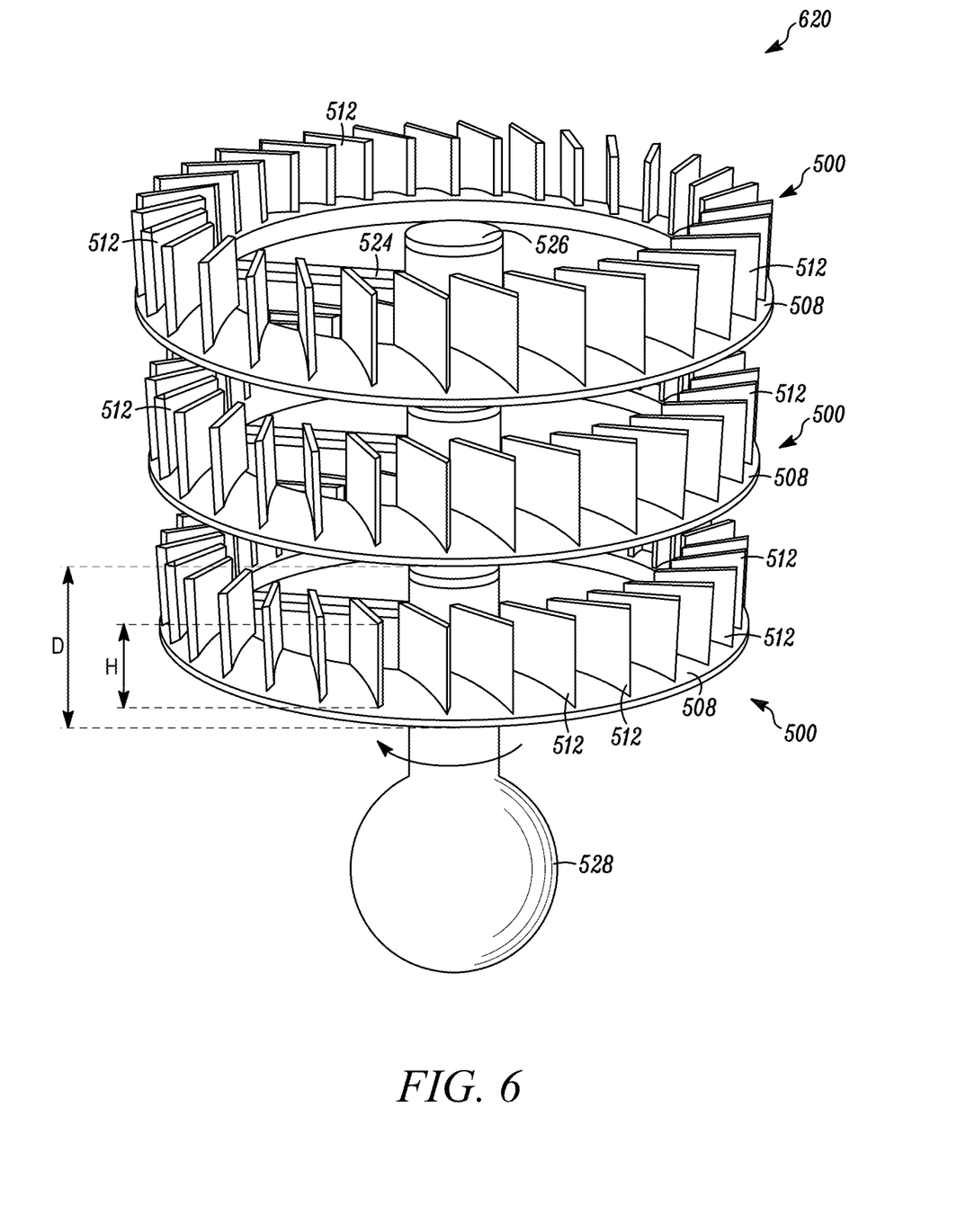
FIG. 6 shows an embodiment of a rotary lift device 620 in which a plurality of flow diverting lift elements 500 are oriented in a coaxially stacked configuration.

FIG. 6 shows an embodiment of a rotary lift device 620 in which a plurality of flow diverting lift elements 500 are oriented in a coaxially stacked configuration with a distance D between each of the coaxially aligned flow diverting lift elements 500. Each flow diverting lift element 500 includes an annular airfoil 508 and a plurality of diversion walls 512 extending perpendicular to annular airfoil 508, as described above. Each diversion wall has a height H. In this embodiment height H or each diversion wall is smaller than distance D between flow diverting lift elements 500. This means that each diversion wall 512 does not extend all the way between adjacent flow diverting lift elements 500. The diversion walls 512 of each flow diverting lift element 500 does not extend to an adjacent flow diverting lift element 500. Rotary lift device 620 as shown in FIG. 6 includes three coaxially stacked flow diverting lift elements 500, each coupled to central axle 526 with one or more connecting arms 524. In some embodiments, rotary lift device 620 includes more or less than three flow diverting lift elements 500.

Figure 7:
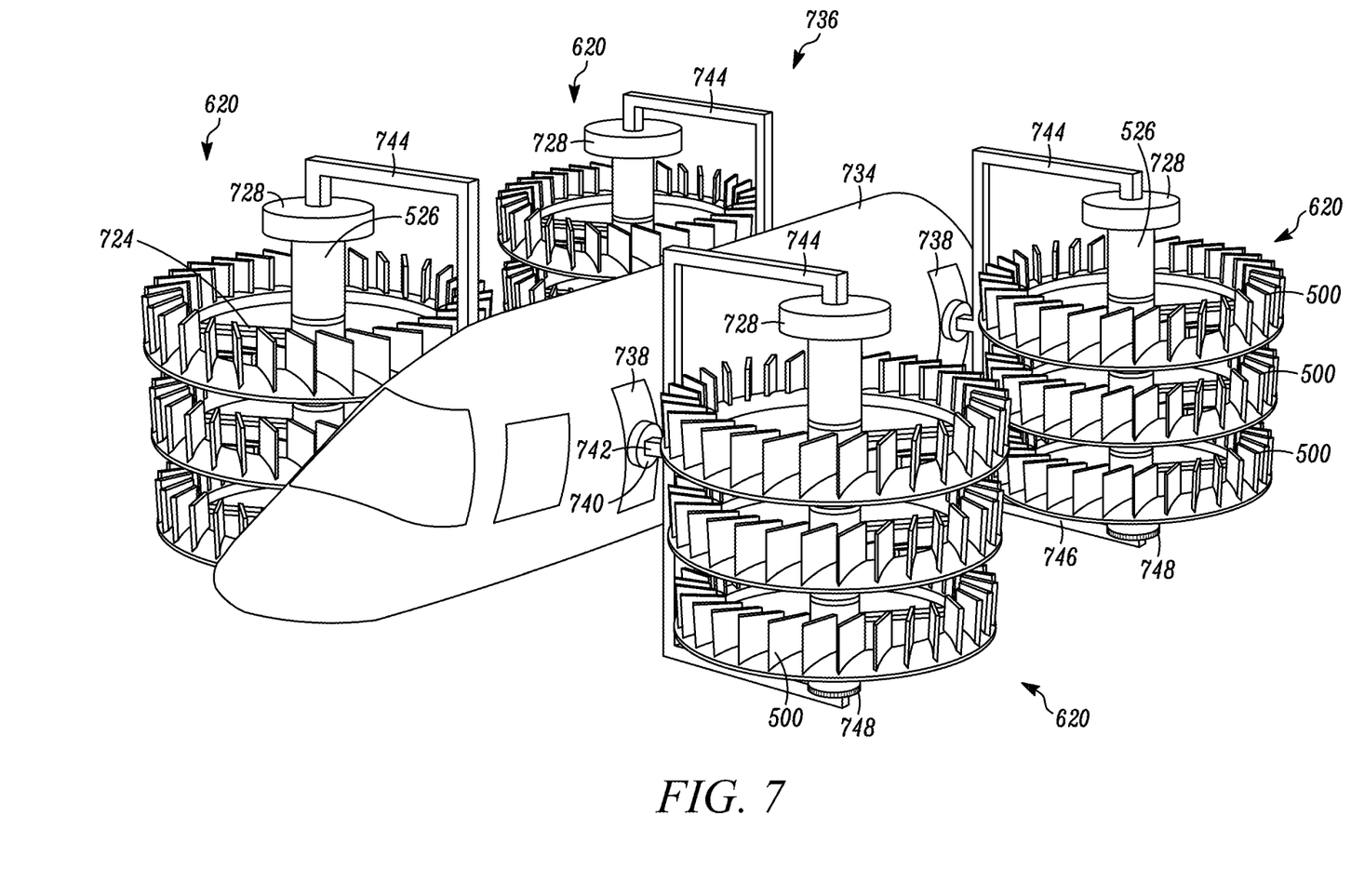
FIG. 7 shows an elevated, side perspective view of an embodiment of rotary lift device 620 an airplane fuselage 734.

FIG. 7 shows an elevated, side perspective view of an aircraft 736 implementing an embodiment of rotary lift device 620. An aircraft fuselage 734 is shown with a plurality of vertical tracks 738 each containing a rotational coupling 740. From each rotational coupling 740 extends an aircraft connecting arm 742, which extends away from the aircraft and bifurcates into an upper arm 744 and a lower arm 746. Joined to each upper arm 744 is a motor 728 which is coupled to central axle 526 of rotary lift device 620. From central axle 726 extend a plurality of connecting arms 724 which connect to a plurality of flow diverting lift elements 500. Connecting the remaining end of central axle 526 to lower arm 746 is lower arm bearing 748.

Generally, the flow diverting lift elements 100, 200, 300 and 500 as described herein, are put into motion similar to conventional foils by providing rotational motion or linear motion such that the leading edges, for example leading edge 104 in FIG. 1, enters a region of space prior to the rest of the local parts, or for circular embodiments, in such a way that a general outward fluid flow results. In the embodiments as shown in FIGS. 1 and 2, the fluid flow direction is right to left, and in FIGS. 3 and 4, which utilize rotational motion, the direction is counter-clockwise. FIG. 5 shows an embodiment which utilizes counter-clockwise rotation, and FIG. 6 shows an embodiment which utilizes clockwise rotation. It should be understood that that the direction of travel can be changed by employing mirror images of any particular embodiment.

It is believed that the flow diverting lift elements 100, 200, 300 and 500 described herein produce improved fluid conditions in the region of space following and immediately behind each flow diverting lift element 100, 200, 300 and 500. This may be understood as due to the redirection, or diversion, of additional turbulent fluid which is created by the operation of the device, away from the device, and away from trailing elements. This allows less turbulent fluid to enter the region to the rear of each diversion wall 112, 312, and 512, and to the front of any trailing elements, such as a foil, or another flow diverting lift element.

It is further believed that the flow diverting lift elements 100, 200, 300 and 500 as described herein produce improved lift at lower velocities. At lower velocities, directing the fluid flow away from the airfoil 108, 308, and 508 prevents conditions which might degrade lift from manifesting in a region of space where those conditions can influence the device. These conditions may include fluid pressures which become relatively high on the upper surface, and towards the rear of a typical foil, when propelled through a fluid at lower velocities and also at an appropriate angle of attack. It is still further believed that the flow diverting lift elements 100, 200, 300 and 500 as described herein have the effect of altering velocities of fluids in such a way as to beneficially affect lift, as opposed to the effective subtraction of an effect as stated above.

It is believed that the lower rotational velocities of rotary lift devices 320, 420, 520, and 620 will have lower noise generation and greater safety as compared to a traditional helicopter rotor, for example. High noise generation can be a problem with traditional helicopter rotors. Rotary lift devices 320, 420, 520, and 620 may be able to generate the required lift at lower rotational velocity, thereby decreasing noise generation. In addition, the lower rotational velocity may increase the safety of people, pets, wildlife, or structures that accidentally come into contact with rotary lift devices 320, 420, 520, and 620.

FIG. 1 may be comprised of a relatively solid material, such as a framed carbon fiber shell or polyurethane foam, but this is not meant to be limiting. It is to be understood that the elements and devices described herein may be formed of any material known or used now or in the future for lifts devices such as wings and rotors Flow diverting lift element 100 is a model of a conventional airfoil 108 with an angled diversion wall 112 placed on its upper surface. The foil shape portion 108 is a means to create a low pressure fluid flow just above upper surface 110, and diversion wall 112 is a means to divert the fluid which flows above upper surface 110 away from, and to the side of, airfoil 108. By doing this, the fluid which is affected and agitated by flow diverting lift device 100 is generally moved away from where a trailing element may follow and in so doing, is likely further accelerated with respect to the surrounding fluid.

It should also be noted that in the embodiment of flow diverting lift elements 100, 200, and 300 as shown in FIG. 1 through FIG. 3, the width of each element (width being the dimension of the airfoil in the wingspan direction) will typically not be very great compared to a typical aircraft wing in which the wingspan is many times the chord length. It is believed that while in motion, the relative fluid flow above upper surface 110, 310, and 510 is temporarily in a low pressure state, and if it isn't diverted quickly enough, or must be diverted over too great a width, or distance, the fluid pressure may normalize, or even become greater than normal pressure, thereby degrading the overall lift, and/or efficiency of the device.

Flow guide wall 216 as shown in FIG. 2A and FIG. 2B is a means to divert the flow which is temporarily in a low pressure state. Flow guide wall 216 is used to direct the flow of fluid and/or isolate a low pressure region above the airfoil from a higher pressure region. Flow guide wall 216 is shown as extending in a direction towards leading edge 104. It is to be understood that similar flow guide walls are used, in some embodiments, with flow diverting lift elements 300 and 500.

In FIG. 3, flow diverting lift element 300 is in plurality and arranged in a circular configuration on an annular disc 322 so that when coupled by means of connecting arms 324 with something that provides rotational motion, such as motor 328, shown in FIG. 3, a lift force is produced by each of flow diverting lift elements 300. Flow diverting lift element 300 is moved through the fluid by attachment to the annular disc 322. Fluid moves from the inside of annular disc 322, over upper surface 350, which creates a low pressure fluid flow, and is then diverted outwardly after being deflected by diversion wall 312. The air flow is generally from inside annular disc 322 to the outside, largely due to the outward fluid flow resulting from the motion of diversion wall 312. Although there is a certain spacing shown between each flow diverting lift element 300, it should be noted that the spacing can be closer with more flow diverting lift elements 300, or further apart with fewer flow diverting lift elements 300, depending on the desired application. Also, it is clear that the direction of travel in the embodiment shown in the figures is counter-clockwise, but can be altered by orienting flow diverting lift elements 300 in a mirror image of their shown orientation on annular disc 322.

FIG. 4 shows flow diverting lift device 420 similar to flow diverting lift device 320 shown in FIG. 3. This embodiment also produces a lift force when a rotational motion is provided by a motivating element such as motor 328. In this embodiment, care should be taken to provide sufficient spacing between each of the vertically stacked, parallel annular discs 322, otherwise interference on the airflow above the upper surface of each of the flow diverting lift elements 300, may degrade the lift produced.

In FIG. 5A, flow diverting lift element 500 is set into circular motion by means of connecting arms 524 which are connected to central axle 526, which is set in counter-clockwise rotational motion by means of motor 528. By virtue of their motion, diversion walls 512 produce a fluid flow in a direction from leading edge 504 towards trailing edge 506. As a result of the generally outward flow of fluid, and the interactions of that flow with the rest of the apparatus, a lift force is produced. To modulate the lift force of this embodiment, the rotational velocity provided by motor 528 can be varied. Lift force produced may be conveyed, for example, by adding conventional bearings. For example, ball bearing units may be used as means to affix central axle 526 to a vehicle when used as a means of propulsion, and thrust bearings may be used as means to transmit the lift force to the said vehicle.

Regarding rotary lift device 620 as shown in FIG. 6, rotational motion is supplied to flow diverting lift elements 500 by motor 528 in the clockwise direction as seen in FIG. 6, which results in a generally outward flow of fluid in the vicinity of the flow diverting lift elements 500 when oriented in a larger region of fluid. As a result of this flow, a lift force is produced in the upward direction.

In FIG. 7, rotor motor 728 provides rotational motion to central axle 526. Power for rotor motor 728 is transmitted from the interior of the aircraft fuselage 734, by connections concealed in each upper arm 744 and aircraft connecting arm 742. The plurality of aircraft connecting arms 742 can each rotate about their axis by typical means concealed in rotational coupling 740, and can partially rotate about the lengthwise axis of the aircraft fuselage 734 along the length of vertical track 738. The position of aircraft connecting arms 742 is controlled by conventional means contained within the aircraft fuselage, in conjunction with appropriate control software and hardware, as well as user input.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A rotary lift device, wherein the device comprises:
    a flow diverting lift element rotatable by a motor, wherein the motor is mechanically coupled to the flow diverting lift element, further wherein the flow diverting lift element comprises an annular airfoil comprising:
    an upper curved surface;
    a lower surface;

a leading edge, wherein the leading edge extends along an inner perimeter of the annular airfoil; and a plurality of diversion walls on the upper curved surface of said annular airfoil, wherein each of the diversion walls intersects the upper curved surface of the annular airfoil at an angle with respect to a tangent to the leading edge and extends above a maximum height of the upper curved surface, and wherein the diversion walls do not extend substantially below the lower surface.

2. The rotary lift device of claim 1, wherein the plurality of diversion walls extend perpendicularly to, and are spaced evenly apart on, the upper curved surface of said annular airfoil.

3. The flow diverting lift element of claim 1, wherein the angle with respect to the tangent to the leading edge is in the range of from about 0 degrees to about 60 degrees.

4. An aircraft having the rotary lift device of claim 1, wherein the rotary lift device is coupled to a fuselage of said aircraft.

5. An aircraft having a plurality of the rotary lift devices of claim 1, wherein each rotary lift device is coupled to a fuselage of said aircraft.

\* \* \* \* \*